(12) United States Patent
Wang et al.

(10) Patent No.: US 11,236,612 B2
(45) Date of Patent: Feb. 1, 2022

(54) ADVANCED MONITORING DEVICE FOR WHOLE-PROCESS DEFORMATION CURVE OF SURROUNDING ROCK OF TUNNEL EXCAVATION AND IMPLEMENTATION METHOD THEREOF

(71) Applicant: CHINA INSTITUTE OF WATER RESOURCES AND HYDROPOWER RESEARCH, Beijing (CN)

(72) Inventors: Xiaogang Wang, Beijing (CN); Lipeng Liu, Beijing (CN); Yujie Wang, Beijing (CN); Yongyu Ling, Beijing (CN); Yufeng Zhao, Beijing (CN); Xingsong Sun, Beijing (CN); Qingwei Duan, Beijing (CN); Ruizhi Fu, Beijing (CN); Ruilang Cao, Beijing (CN); Ping Sun, Beijing (CN); Jin Pi, Beijing (CN); Long Jiang, Beijing (CN); Xingchao Lin, Beijing (CN)

( * ) Notice: Subject to any disclaimer, the term of this patent is extended or adjusted under 35 U.S.C. 154(b) by 491 days.

(21) Appl. No.: 16/398,993

(22) Filed: Apr. 30, 2019

(65) Prior Publication Data

US 2020/0018164 A1 Jan. 16, 2020

(30) Foreign Application Priority Data

Jul. 12, 2018 (CN) .......................... 201810762556.2

(51) Int. Cl.
*G01B 5/28* (2006.01)
*G01C 7/06* (2006.01)
(Continued)

(52) U.S. Cl.
CPC .............. *E21D 9/003* (2013.01); *G01B 5/28* (2013.01); *G01C 7/06* (2013.01); *G01C 15/105* (2013.01); *G01D 5/35316* (2013.01)

(58) Field of Classification Search
CPC ......... E21D 9/003; G01B 5/28; G01B 11/165; G01B 11/16; G01C 7/06; G01C 15/105; G01D 5/35316
(Continued)

(56) References Cited

U.S. PATENT DOCUMENTS 8,701,794 B2 * 4/2014 Zediker .................... E21B 7/15
175/16
8,826,973 B2 * 9/2014 Moxley .................. E21B 43/11
166/77.2
(Continued)

FOREIGN PATENT DOCUMENTS

JP 2016000933 A * 1/2016
WO WO-2019114998 A1 * 6/2019 ............. C09K 17/00

*Primary Examiner* — Yaritza Guadalupe-Mccall
(74) *Attorney, Agent, or Firm* — W&KIP

(57) ABSTRACT

An advanced monitoring device and an implementation method for a whole-process deformation curve of a surrounding rock during tunnel excavation is disclosed, comprising a steel pipe elastic body, a cathetometer structure and an embedded optical fiber, and an implementation step; the cathetometer is an equidistant series structure, and fixed in the steel pipe; the embedded optical fiber is encapsulated in the surface slot of the steel pipe; the cathetometer and the embedded optical fiber and the steel pipe form a deformation coordination structure, and the deformation of the surrounding rock can be deduced by calculating the variation of the cathetometer and the deformation of the optical fiber. The invention can test and calculate the deformation curve of the surrounding rock in front of the excavation face during tunnel excavation, and provide support for engineering dynamic design, construction and safety.

9 Claims, 17 Drawing Sheets

(51) Int. Cl.
  *G01C 15/10* (2006.01)
  *E21D 9/00* (2006.01)
  *G01D 5/353* (2006.01)
(58) Field of Classification Search
  USPC .......................................................... 33/302
  See application file for complete search history.

(56) References Cited

U.S. PATENT DOCUMENTS

2019/0186095 A1\* 6/2019 Eddie ........................ E02D 3/12
2020/0018164 A1\* 1/2020 Wang ...................... E21D 9/003

\* cited by examiner

ADVANCED MONITORING DEVICE FOR WHOLE-PROCESS DEFORMATION CURVE OF SURROUNDING ROCK OF TUNNEL EXCAVATION AND IMPLEMENTATION METHOD THEREOF

CROSS-REFERENCE TO RELATED APPLICATIONS

This application claims priority to Chinese Patent Application No. 201810762556.2 with a filing date of Jul. 12, 2018. The content of the aforementioned applications, including any intervening amendments thereto, are incorporated herein by reference.

TECHNICAL FIELD

The invention relates to the field of deformation measurement and control of surrounding rock in underground engineering, in particular to an advanced monitoring device and method for deformation curve of surrounding rock of tunnel excavation.

BACKGROUND OF THE INVENTION

Tunnel project is generally of large scale and has complicated engineering, geological conditions. During the excavation of the rock mass, the surrounding rock mass (surrounding rock) is deformed due to stress re-adjustment. The stability of surrounding rock is affected by many factors. The engineering practice shows that the deformation of tunnel surrounding rock during construction has an important reference role in the stability evaluation of tunnel surrounding rock and the selection of supportive parameters of the cavern.

At present, the monitoring of tunnel deformation mainly focuses on the displacement of rock mass, convergence and settlement, etc. The measuring instruments used mainly comprise conventional measuring apparatus such as level, theodolite and total station, as well as photogrammetric apparatus. The measurement accuracy is high, but the following shortcomings exist: (1) they are point type measurement, the layout of point is random, although the increase of the number of measuring points can improve the reliability, it will greatly increase the cost, and the arrangement of the measuring points is greatly affected by the construction organization in the tunnel; (2) the object of the measurement is the deformation of the internal tunnel wall of the tunnel, which does not reflect the deformation of the interior of the surrounding rock; (3) the measurement is directed only to the excavated section, and the deformation of the section without excavation and during excavation before excavation of the face cannot be monitored, the measured value is not the magnitude of the entire deformation stage of the surrounding rock, and cannot reflect the true deformation feature of the surrounding rock which is particularly important in the analysis and evaluation of surrounding rock stability and cavern supportive design.

Therefore, it is an urgent problem to design and study a device that can continuously measure the whole-process deformation of the surrounding rock before and after the excavation of the tunnel face.

SUMMARY OF THE INVENTION

An object of the present invention is to provide an advanced monitoring device for whole-process deformation curve of a surrounding rock for tunnel excavation and an implementation method thereof, which can conduct advanced monitoring the deformation of the surrounding rock during tunnel excavation construction, can solve the above technical problems, and can be used for monitoring the deformation of tunnel portions of the surrounding rock before and after excavation of sections.

According to the present invention, an advanced monitoring device for deformation curve of a surrounding rock during tunnel excavation comprises: the surrounding rock, an excavation tunnel opened in the surrounding rock, and a drilling hole provided in the surrounding rock and connected to the excavation tunnel, and is disposed at one side with a drilling hole outer port sealing body, a grouting pipe and a steel pipe of tubular structure disposed in the drilling hole, a steel pipe optical fiber slot and a steel pipe embedded optical fiber entry hole opened on the outer surface of the steel pipe, a steel pipe outer end sealing body is provided at one end of the steel pipe, and a steel pipe inner plug is provided at the other end of the steel pipe, a steel pipe embedded optical fiber encapsulated in the steel pipe optical fiber slot, the steel pipe embedded optical fiber is led out of both ends of the steel pipe, and at least one cathetometer disposed in the steel pipe, the cathetometer is connected in series by cathetometer optical fibers, and is fixed to the steel pipe inner plug at the inner end of the steel pipe by a cathetometer securing cable, and a cathetometer pipet connected to the cathetometer optical fiber by the cathetometer securing cable and the cathetometer.

Further, the drilling hole is located in the top surrounding rock in front of the excavation face of the excavation tunnel, in line with the direction of the tunnel axis and at an angle to the tunnel axis, and the drilling hole is drilled through a TBM observation hole or formed at other operable places.

Further, the cathetometer is fixed into the steel pipe in a series structure formed at equidistant or variable distance through the cathetometer optical fiber, and the signal measurement can be performed at both ends of the cathetometer optical fiber.

Further, the steel pipe embedded optical fiber encapsulated inside the steel pipe optical fiber slot enters the steel pipe through the steel pipe embedded optical fiber entry hole and is drawn out of the pipe for measurement.

Further, the steel pipe embedded optical fiber is encapsulated in the steel pipe of the optical fiber slot by epoxy resin or other bonding materials, and forms a deformation coordination body with the steel pipe.

Further, the steel pipe embedded optical fiber and the steel pipe embedded optical fiber entry hole may both be provided in multiples to meet length requirements on different measurement.

Further, the steel pipe embedded optical fiber is an FBG optical fiber, and is measurable for the micro-deformation to calculate information of the deformed body such as pressure and displacement.

Further, the steel pipe embedded optical fiber and the cathetometer optical fiber can be drawn out of the drilling hole through the drilling hole outer port sealing body for measurement.

The invention also provides an implementation method for the advanced monitoring device for a whole-process deformation curve of the surrounding rock for tunnel excavation, comprising the following steps:

Step 1: producing drilling hole(s) at the top of the excavation section of the excavation tunnel according to the measurement needs;

Step 2: making a steel pipe optical fiber slot and a steel pipe embedded optical fiber entry hole in corresponding positions of the steel pipe;

Step 3: connecting cathetometers in series, and injecting a certain amount of solution into each cathetometer pipet to conduct measurement; fixing the cathetometer to the inner end of the steel pipe plug through the cathetometer securing cable and fixing the steel pipe inner end plug to the inner end of the steel pipe; if there are a plurality of cathetometer series structures, they can be arranged in the steel pipe at equidistant or marginal distance, and leading the cathetometer optical fiber out of the pipe;

Step 4: encapsulating the steel pipe embedded optical fiber in the steel pipe optical fiber slot, and leading the two ends of the optical fiber out of the pipe;

Step 5: putting the steel pipe into the drilling holes separately, conducting weld to each segment, and connecting and arranging the cathetometer according to the length and encapsulating the steel pipe embedded optical fiber, and leading the cathetometer optical fiber and the end of the steel pipe embedded optical fiber through the steel pipe and finally out of the pipe;

Step 6: fixing the steel pipe after all the steel pipes are placed in the drilling hole, leading the steel pipe embedded optical fiber out of the drilling hole, and sealing the ends of the steel pipe;

Step 7: sealing the aperture of the drilling hole;

Step 8: grouting the drilling hole through the grouting pipe, so that the steel pipe and the surrounding rock form a deformation coordination structure through the grouting body;

Step 9: conducting tunnel excavation, and measuring the cathetometer optical fiber and the steel pipe embedded optical fiber, and recording the data;

Step 10: processing the measurement data and calculating the deformation curve of the surrounding rock.

Advantageous Effects of the Invention (1) Using the advanced drilling of the surrounding rock, the deformation of the unexcavated rock mass can be monitored, meanwhile the deformation of the surrounding rock during the tunnel excavation can be monitored, the safety of the tunnel and the stability of the surrounding rock can be evaluated in advance, the deformation of the surrounding rock can be predicted, and the construction schemes such as the later excavation mode or the excavation speed can be provided, which can also play an early warning role in preventing disasters and ensuring safety;

(2) Using a series cathetometer, a relatively continuous measurement can be performed on a specific position as needed, and the measurement result has continuity in time, has uniformity in space, and can form complete deformation data at a specific position in the time domain, which is of great significance for studying the deformation characteristics of surrounding rock, predicting disasters, and evaluating construction techniques;

(3) Using optical fiber technology distributed along the full length of the advanced drilling hole, deforming in coordination with the steel pipe and surrounding rock, and the deformation of the surrounding rock can be monitored continuously and completely, and the deformation data of the surrounding rock continuously distributed along the advanced drilling hole can be formed in the continuous time domain, which is of great significance to study the deformation of surrounding rock;

(4) Using advance drilling technology to manufacture advance hole, in combination with drilling TV, sound wave and other technologies, the properties and geological defects of the rock layer to be excavated in front of the face can be directly understand, which is beneficial to the stability of surrounding rock;

(5) The monitoring data of multiple optical fibers and series cathetometers distributed along the entire length of the advanced drilling hole can be mutually verified to ensure the reliability and integrity of the monitoring data;

(6) In the present invention, the internal deformation of the surrounding rock at different depths can be monitored by the series cathetometer and the full-length distributed optical fiber, and the deformation of the rock body at different depths outside the tunnel wall can be monitored. The monitoring data can reflect the true deformation in the rock mass around the tunnel, which provides data support for directly determining the stability of surrounding rock and the design of supportive parameters.

DRAWINGS

Figure 1:
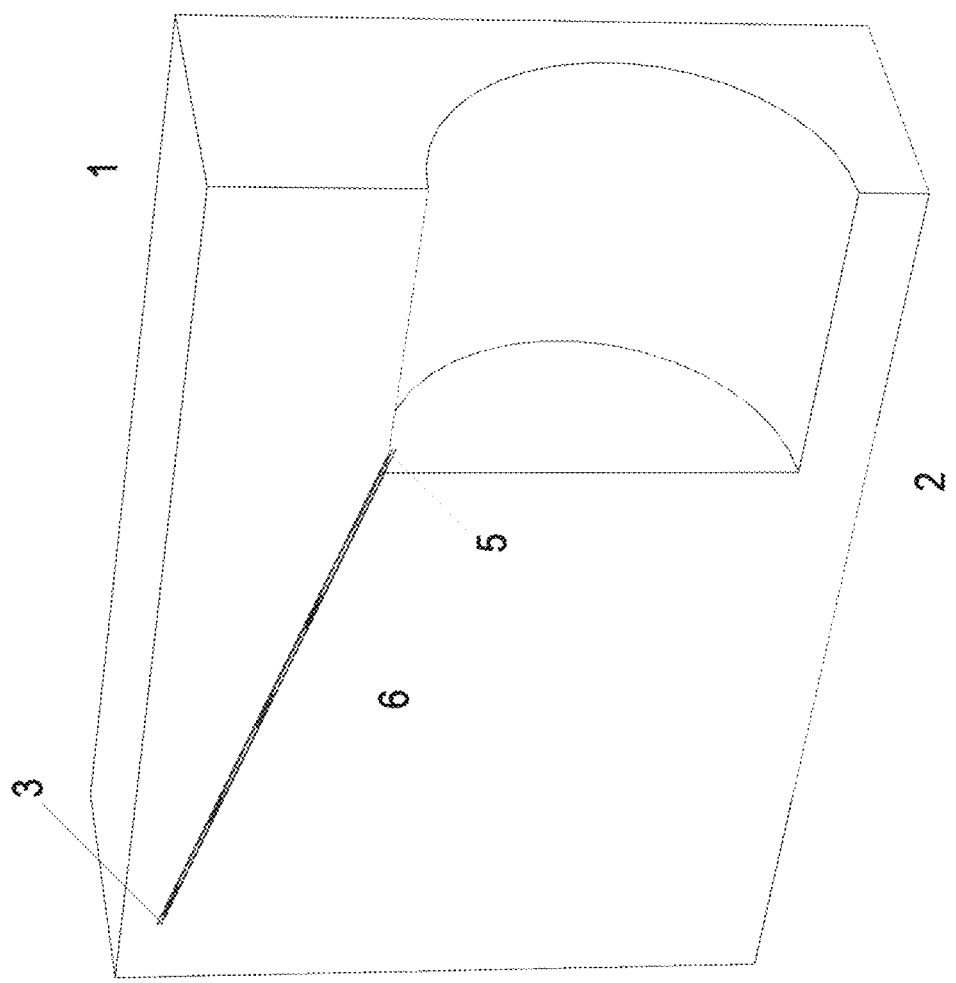
FIG. 1 is an overall view of a test apparatus in the present invention.

Wherein, 1—surrounded rock; 2—excavation tunnel; 3—drilling hole; 301—drilling hole outer port sealing body; 302—grouting pipe; 4—steel pipe; 401—steel pipe outer end sealing body; 402—steel pipe optical fiber slot; 403—steel pipe embedded optical fiber entry hole; 404—steel pipe inner end plug; 5—steel pipe embedded optical fiber; 6—cathetometer; 601—cathetometer optical fiber; 602—cathetometer pipet; 7—cathetometer securing cable.

DETAILED DESCRIPTION OF THE INVENTION

The technical solutions in the embodiments of the present invention will be clearly and completely described in the following with reference to the accompanying drawings.

Example 1

As shown in FIGS. 1-12, an advanced monitoring device for deformation curve of a surrounding rock during whole process for a tunnel excavation comprises a surrounding rock 1, an excavation tunnel 2, a drilling hole 3, a drilling hole outer port sealing body 301, and a grouting pipe 302, a steel pipe 4, a steel pipe outer end sealing body 401, a steel pipe optical fiber slot 402, a steel pipe embedded optical fiber entry hole 403, a steel pipe inner end plug 404, a steel pipe embedded optical fiber 5, a cathetometer 6, a cathetometer optical fiber 601, a cathetometer pipet 602 and a cathetometer securing cable 7.

Figure 2:
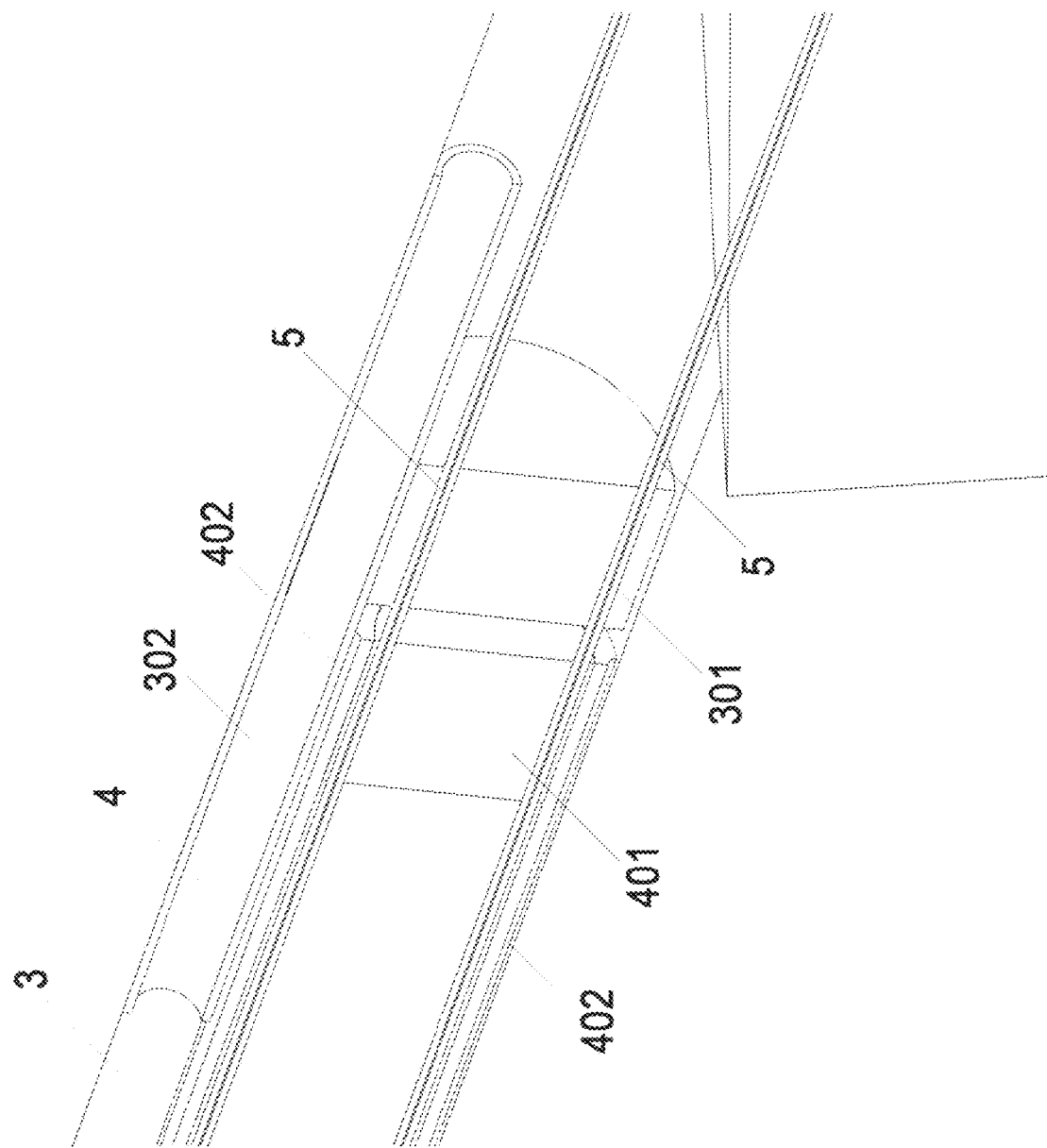
FIG. 2 is a detailed view of the drilled hole in the present invention.
Figure 3:
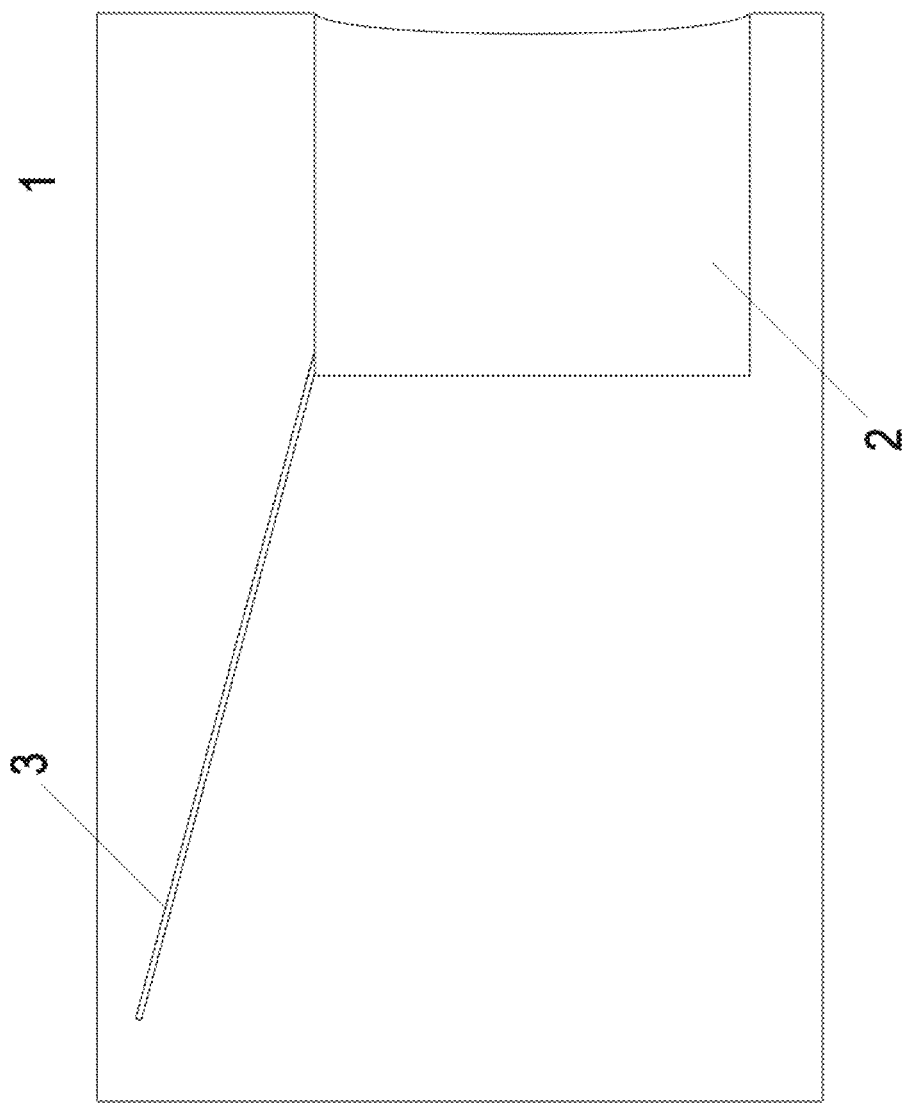
FIG. 3 is a schematic cross-sectional view of a drilling hole in the present invention.
Figure 4:
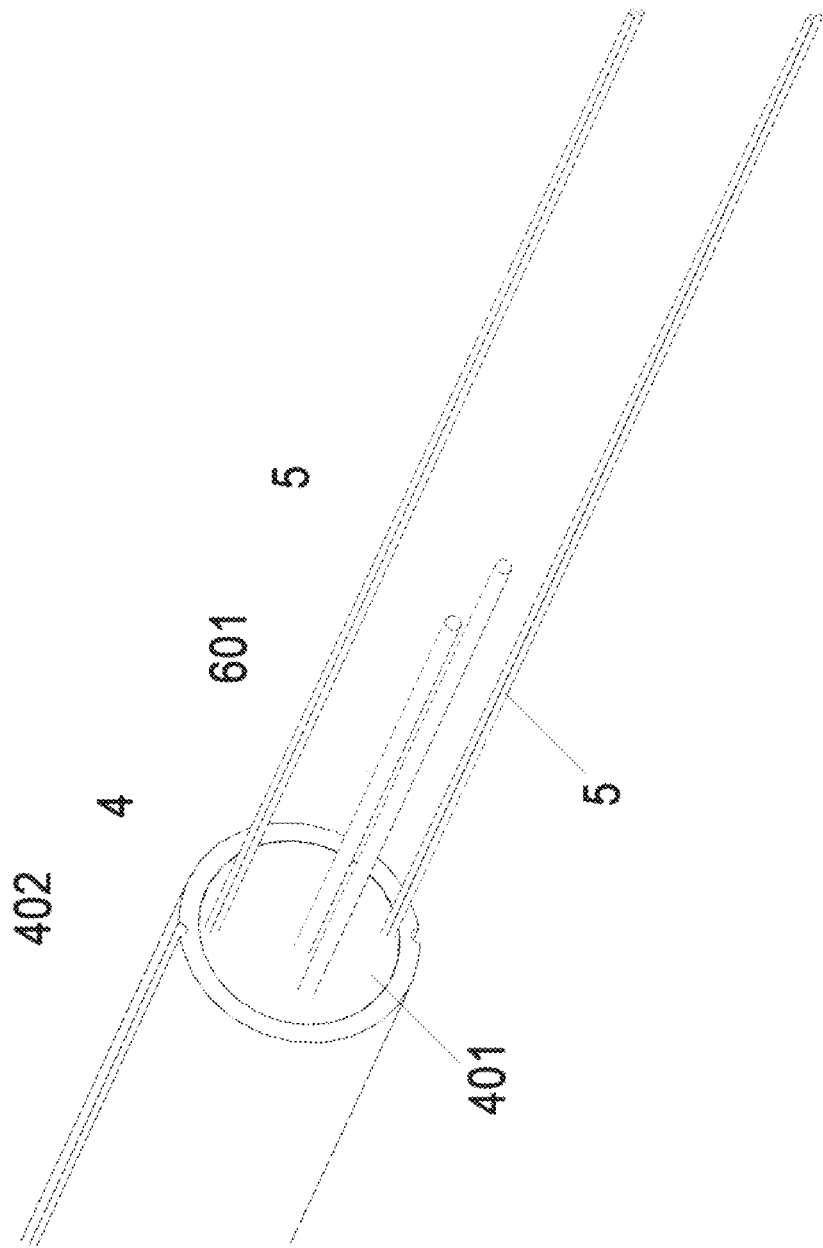
FIG. 4 is a schematic view of the outer end of the steel pipe of the present invention.
Figure 5:
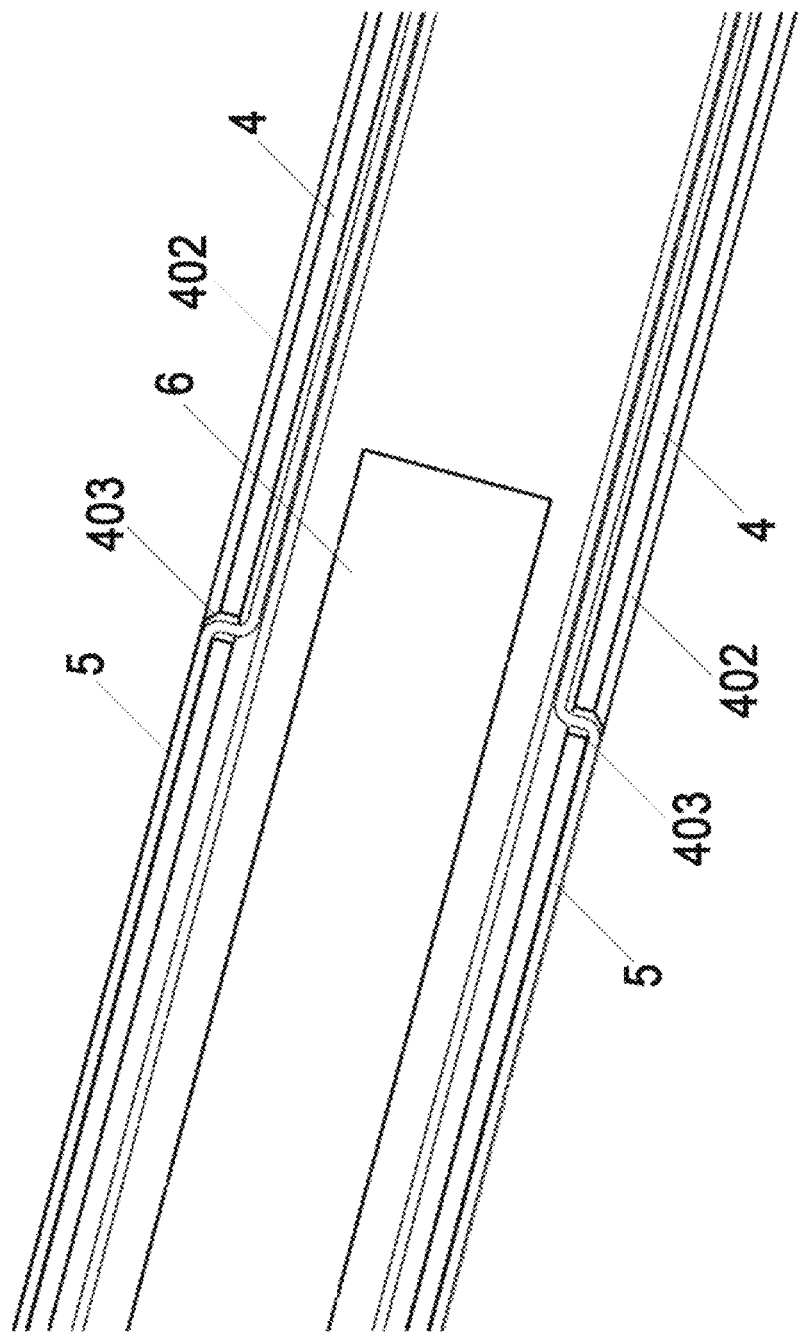
FIG. 5 is a cross-sectional view of the outer side steel pipe embedded optical fiber entry hole in the present invention.
Figure 6:
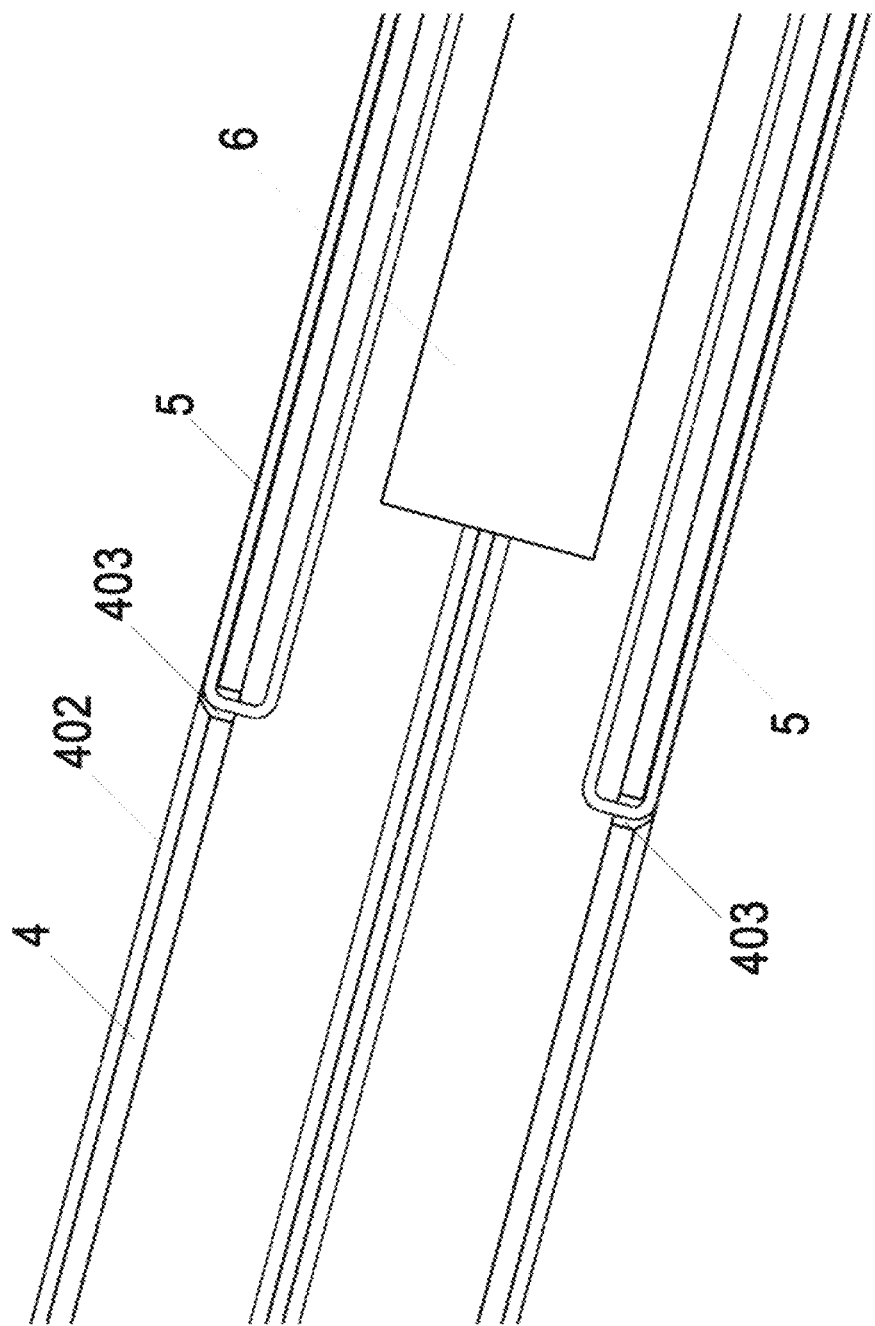
FIG. 6 is a cross-sectional view of the inner side steel pipe embedded optical fiber entry hole in the present invention.
Figure 7:
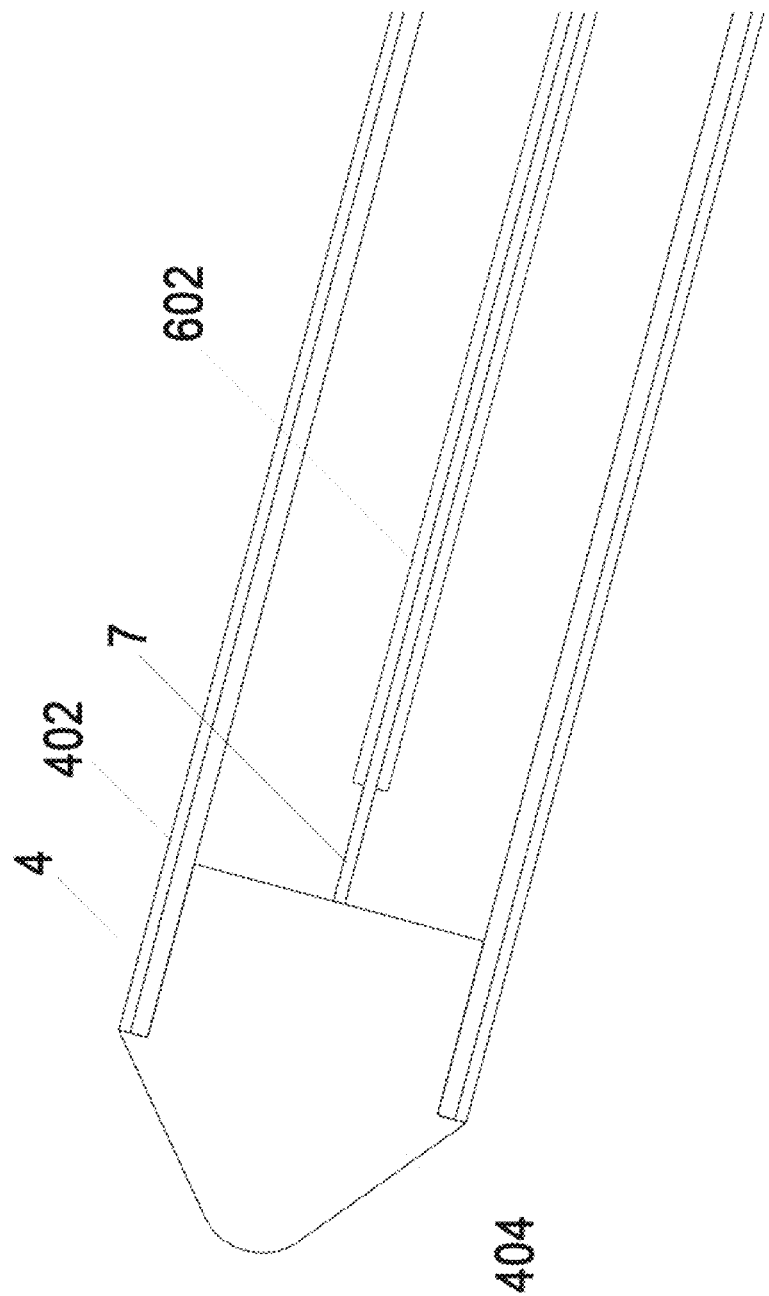
FIG. 7 is a cross-sectional view of the inner end of the steel pipe of the present invention.
Figure 8:
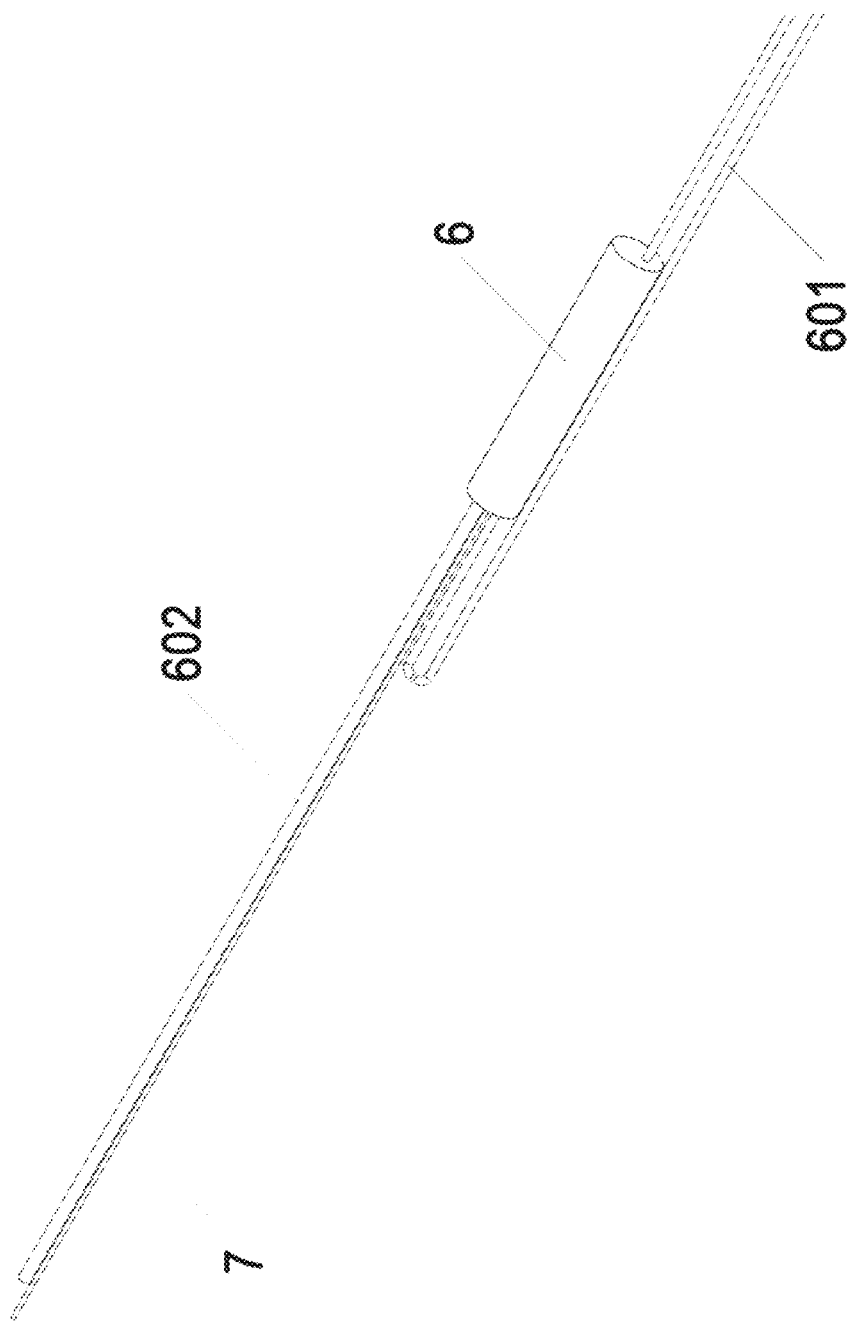
FIG. 8 is a schematic view of the top cathetometer of the present invention.
Figure 9:
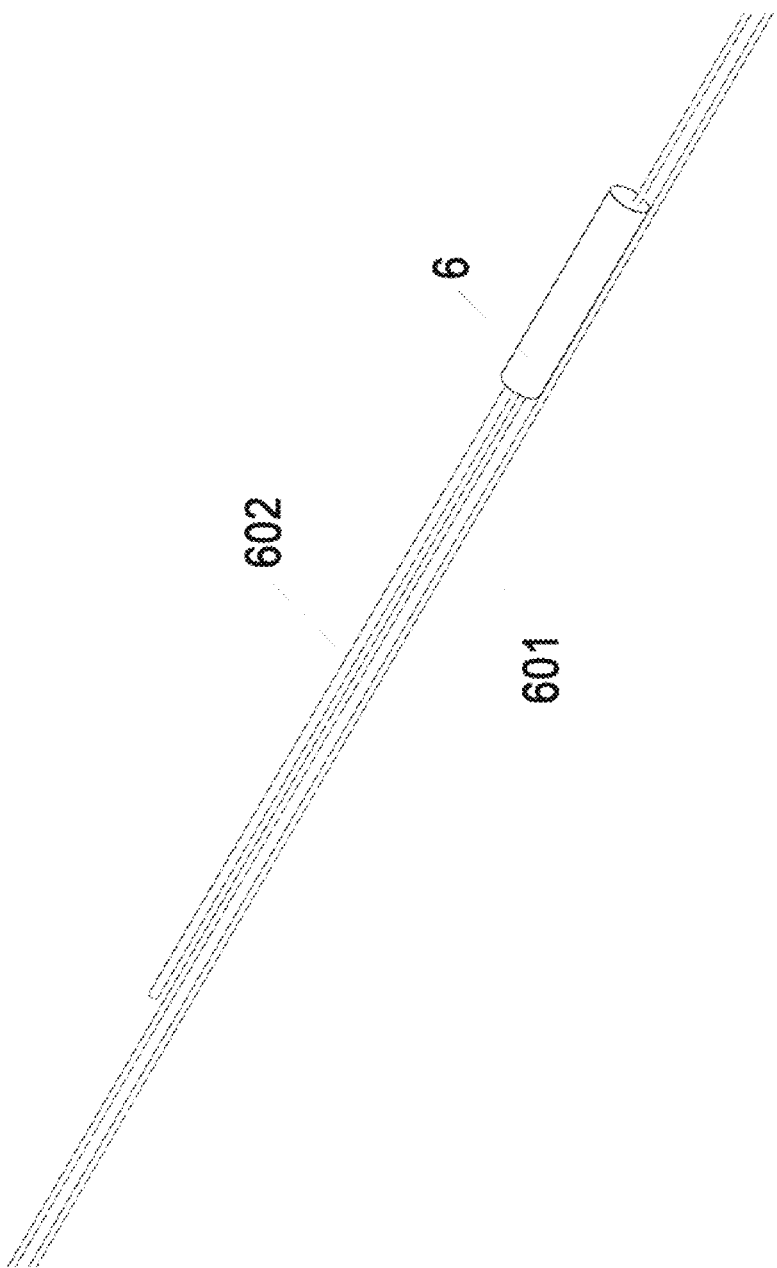
FIG. 9 is a schematic view of the cathetometer of the present invention.
Figure 10:
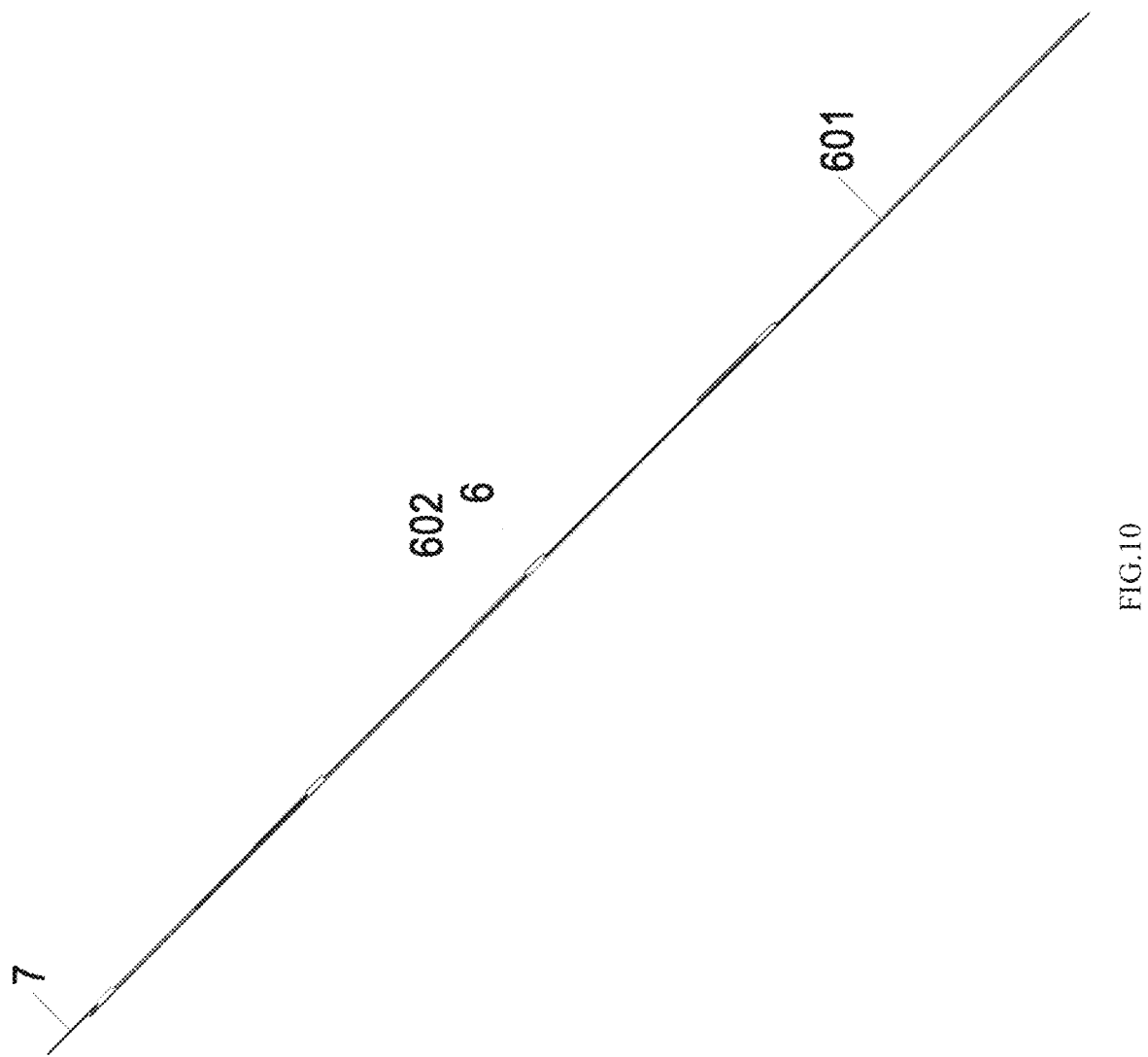
FIG. 10 is a schematic overall view of the cathetometer.
Figure 11:
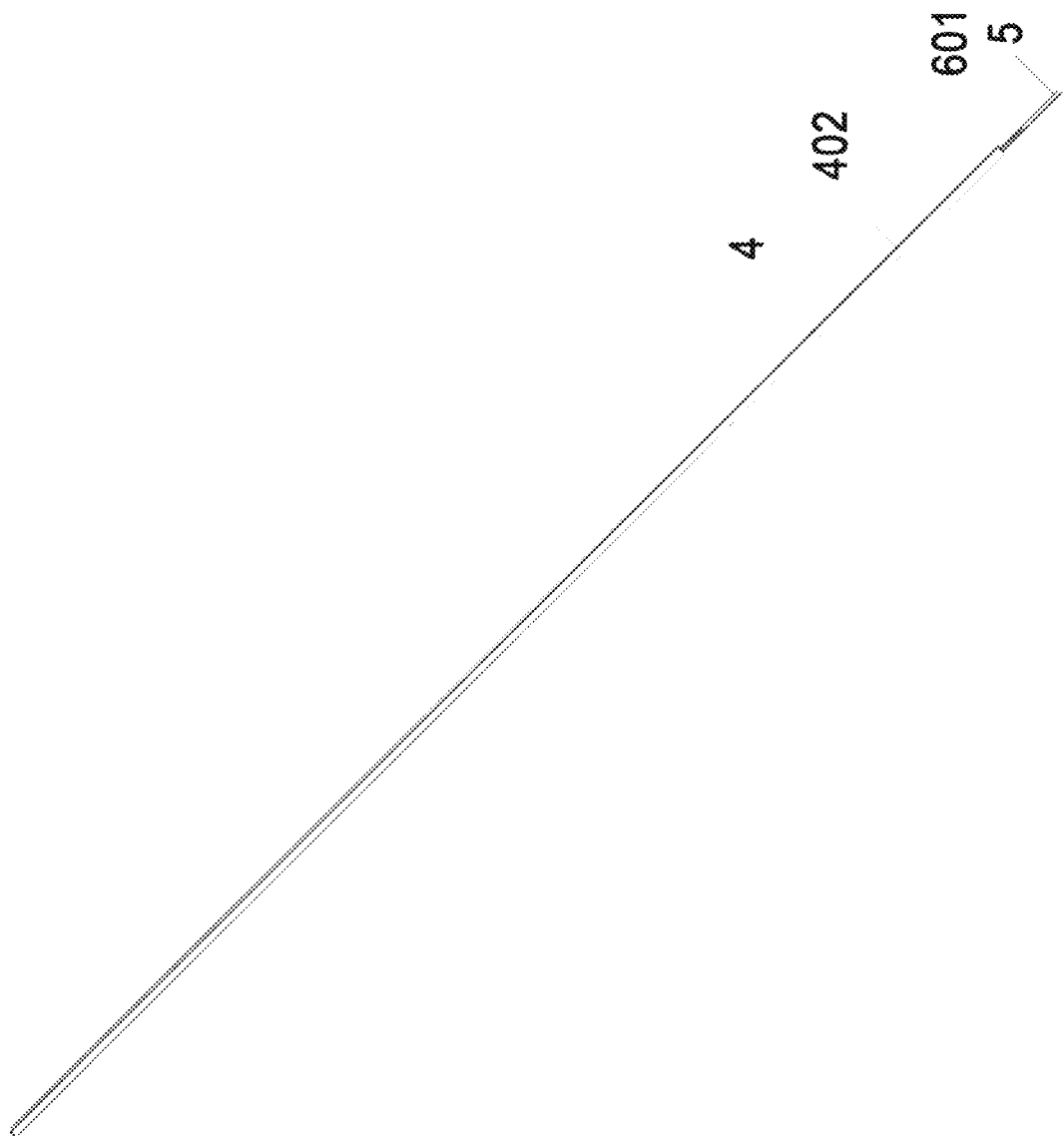
FIG. 11 is a schematic view of the entire steel pipe.
Figure 12:
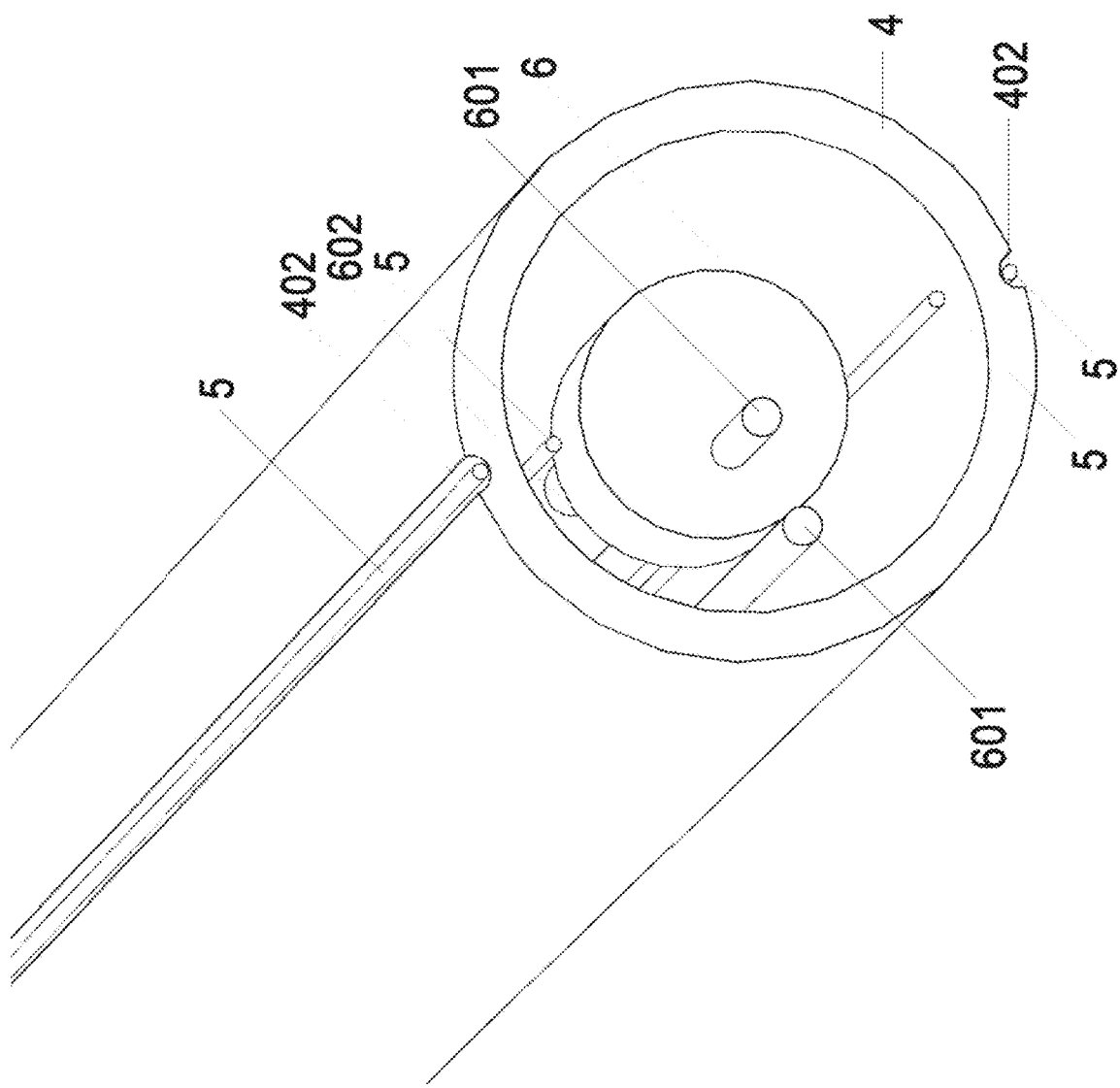
FIG. 12 is a cross-sectional view of a steel pipe.

As shown in FIGS. 1, 2 and 3, the drilling hole 3 is located in the top surrounding rock 1 in front of the excavation face of the excavation tunnel 2, which is aligned with the axis of the tunnel 2 and at a small angle to the axis of the tunnel 2; the drilling hole 3 can be formed by TBM observation holes or drilling at other operable places; the length of the drilling hole 3 can be set according to the measurement requirements.

As shown in FIGS. 5 to 10, the cathetometer 6 is connected by a cathetometer optical fiber 601 at equal distance or variable distance to form a series structure, and the cathetometer optical fiber 601 can perform signal measurement at both ends; the cathetometer 6 series structure is fixed at the steel pipe inner end plug 404 through the cathetometer securing cable 7, and the steel pipe inner end plug 404 is fixed to the inner end of the steel pipe 4, so that the cathetometer 6 series structure is fixed in the steel pipe; the two ends of the cathetometer optical fiber 601 are respectively led out of the outer end of the steel pipe 4 to facilitate measurement; the cathetometer 6 can adjust the number of series according to the measurement length, or add additional series structures, and form an equidistant or variable distance distribution with the existing series structure, and measure separately.

As shown in FIGS. 4, 5, 6, 7, 11 and 12, the steel pipe 4 has a tubular structure, and the inner diameter can be placed with a cathetometer 6 series structure and a cathetometer optical fiber 601 and a steel pipe embedded optical fiber 5, and the outer diameter should be smaller than that of the drilling hole 3, and the grouting pipe 302 can be arranged at the aperture of the drilling hole 3; the steel pipe 4 can be welded by ordinary steel pipe in the field to form the required length; the steel pipe 4 is provided with the steel pipe optical fiber slot 402 at the outer side at 12 o'clock and 6 o'clock, which is sized to meet the requirements for the embedment of the steel pipe embedded optical fiber 5; the steel pipe 4 is provided with a steel pipe embedded optical fiber entry hole 403 in the inner and outer positions of the steel pipe optical fiber slot 402, and the steel pipe embedded optical fiber 5 embedded in the steel pipe optical fiber slot 402 enters the steel pipe 4 through the steel pipe embedded optical fiber entry hole 403 and is led out of the pipe for measurement; the steel pipe embedded optical fiber 5 is encapsulated in the steel pipe optical fiber slot 402 by epoxy resin or other bonding material, and forms a deformation coordination body with the steel pipe 4; the steel pipe embedded optical fiber 5 and the steel pipe embedded optical fiber entry hole 403 may both be provided in plurality to meet different requirements on length measurement; the steel pipe 4 is provided with a steel pipe outer end sealing body 401 at the outer end thereof for sealing the opening of the pipe, the steel pipe embedded optical fiber 5 and the cathetometer optical fiber 601 may be led out of the pipe through the steel pipe outer end sealing body 401.

As shown in FIGS. 4, 5, 6 and 12, the steel pipe embedded optical fiber 5 is an FBG optical fiber, and the micro deformation can be measured to calculate the pressure and displacement of the deformed body.

As shown in FIGS. 1, 2 and 3, the drilling hole 3 is provided with a drilling hole outer port sealing body 301 at its aperture and the steel pipe embedded optical fiber 5 is sealed in the drilling hole 3. The steel pipe embedded optical fiber 5 and the cathetometer optical fiber 601 can be led out of the aperture of the drilling hole 3 through the drilling hole outer port sealing body 301 for measurement; the drilling hole 3 is provided with a grouting pipe 302 at its aperture, and the drilling hole 3 can be sealed by grouting after the seal of the drilling hole 3, allowing the entire structure to form a deformation coordination structure.

Example 2

The deformation curve measurement of the surrounding rock of vault is carried out in the Duoxiongla tunnel of the Tibet Paimo Highway Project, using the advanced monitoring device of Example 1.

Figure 13:
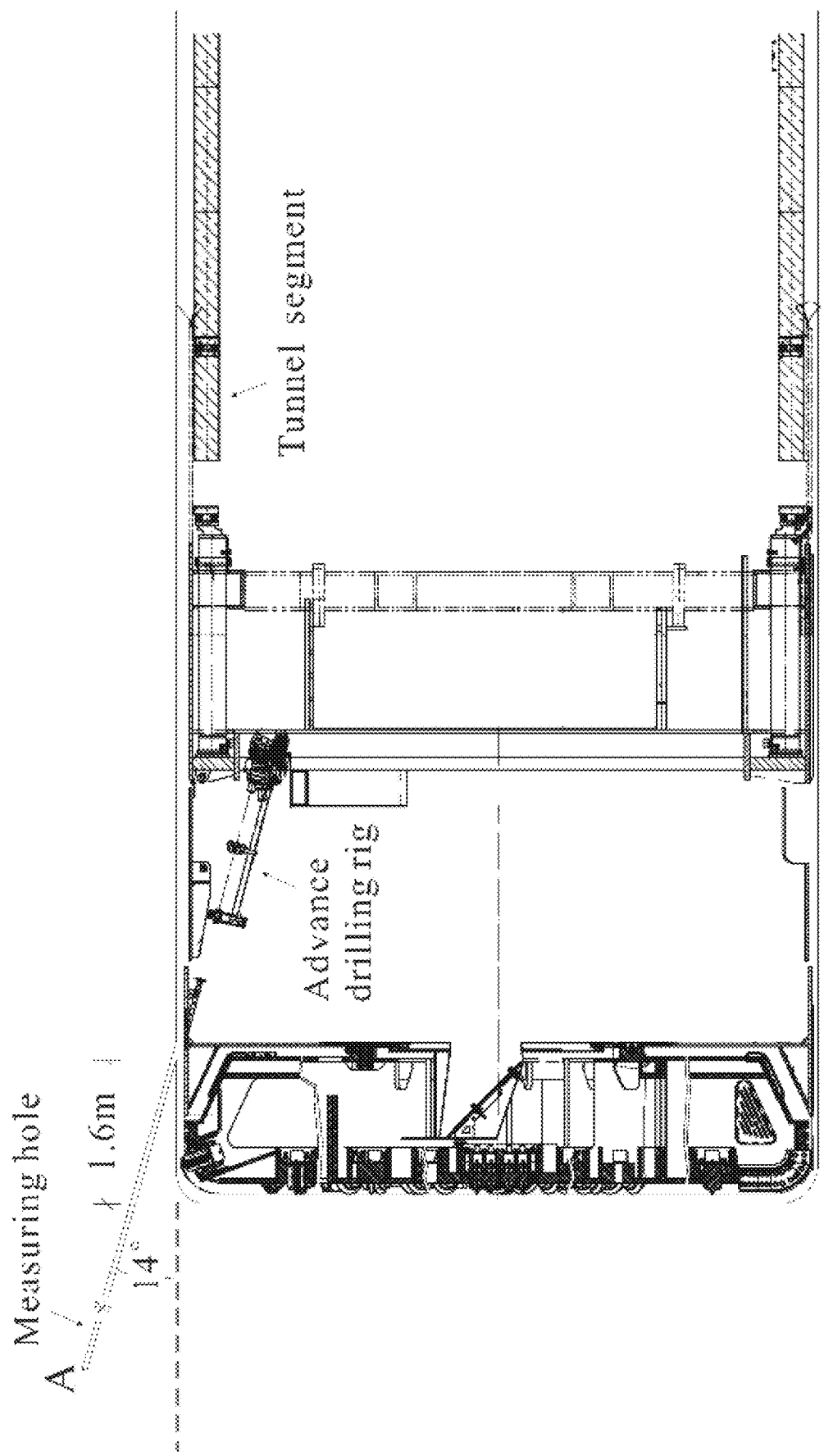
FIG. 13 is a schematic view of the advanced drilling position.

Step 1: producing the drilling hole 3 at the top of the excavation section of the excavation tunnel 2 according to the measurement needs; a monitoring section of the convergence deformation of the surrounding rock of the vault is selected. The pile number is K12+475.95. The surrounding rock has good integrity, the GSI value is 55-65 (Hoek, 2018) and the depth of burial is 410.0 m. Due to the large depth of burial, it is impossible to install the measuring equipment by surface drilling. Combined with the characteristics of the double shield TBM equipment, the advanced geological drilling contained in the TBM is used to drill a deep drilling hole of 20 m with a hole diameter of 80 mm and an elevation angle of 14°. As shown in FIG. 13, point A of the bottom of the drilling hole is assumed to be a fixed point, which is the reference point for the calculation of the deformation of the surrounding rock.

Figure 14:
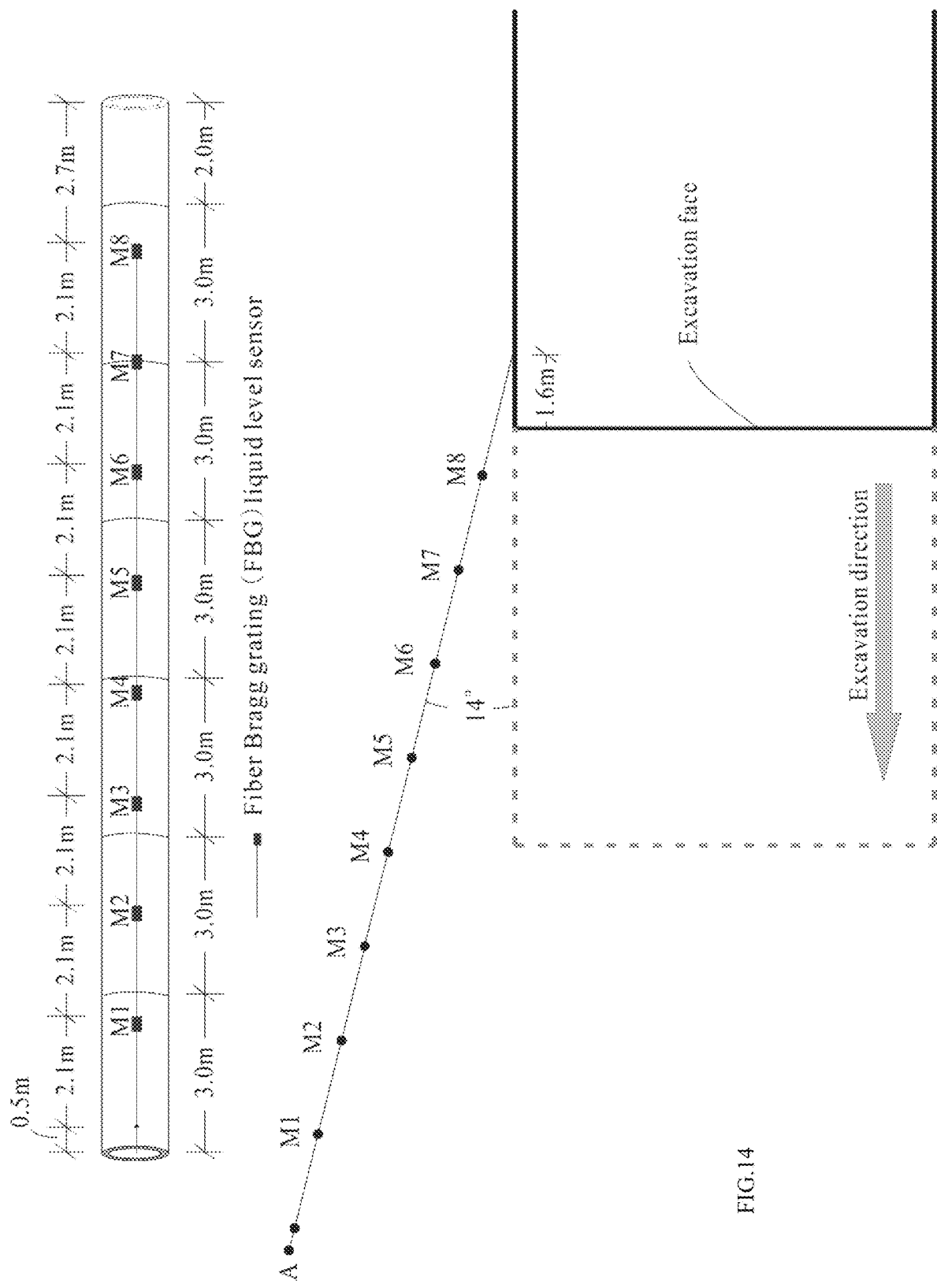
FIG. 14 is a schematic view of a measuring pipe installed with a cathetometer. Wherein, M1-M8 is the number of the cathetometer (FBG static level).

Step 2: producing the steel pipe optical fiber slot 402 and the steel pipe embedded optical fiber entry hole 403 in corresponding positions distribution of the segmented steel pipe;

Step 3: connecting cathetometers 6 in series, and injecting a certain amount of solution into each cathetometer pipet 602 to conduct measurement; fixing the cathetometer 6 to the inner end of the steel pipe plug 404 through the cathetometer securing cable 7 and fixing the steel pipe inner end plug 404 to the inner end of the steel pipe 4; if there are a plurality of cathetometer 6 series structures, they can be arranged in the steel pipe at equidistant or marginal distance, and leading the cathetometer 6 optical fiber out of the pipe; For example, a steel pipe with an inner diameter of 60 mm is used as an external measuring pipe (a 3.0 m 6—section long steel pipe is further welded at its end with a section of long steel pipe of 2.0 m), the total length of the measuring pipe is 20.0 m, and the cathetometer 6 (FBG static level) is installed inside the measuring pipe in an interval of 2.1 m in the steel pipe, as particularly shown in FIG. 14.

Step 4: encapsulating the steel pipe embedded optical fiber 5 in the steel pipe optical fiber slot 402, and leading the two ends of the optical fiber out of the pipe;

Step 5: putting the steel pipe 4 into the drilling holes 3 separately, conducting weld to each segment, and connecting and arranging the cathetometer 6 according to the length and encapsulating the steel pipe embedded optical fiber 5, and leading the cathetometer 6 optical fiber and the end of the steel pipe embedded optical fiber 5 through the steel pipe 4 and finally out of the pipe;

Step 6: fixing the steel pipe 4 after all the steel pipes 4 are placed in the drilling hole 3, leading the optical fiber out of the drilling hole 3, and sealing the ends of the steel pipe 4;

Step 7: sealing the aperture of the drilling hole 3;

Step 8: grouting the drilling hole 3 through the grouting pipe 302, so that the steel pipe 4 and the surrounding rock 1 form a deformation coordination structure through the grouting body; after the measuring pipe is installed, sealing the drilling hole by a foaming agent. After the foaming agent is solidified, grouting into the hole until the grouting is returned from the exhaust pipe, such that the grouting is completed. After the grouting is sealed for 24 hours, the test is carried out.

Step 9: conducting tunnel excavation, and measuring the cathetometer optical fiber 601 and the steel pipe embedded optical fiber 5, and recording the data;

Step 10: processing the measurement data and calculating the deformation curve of the surrounding rock.

Figure 15:
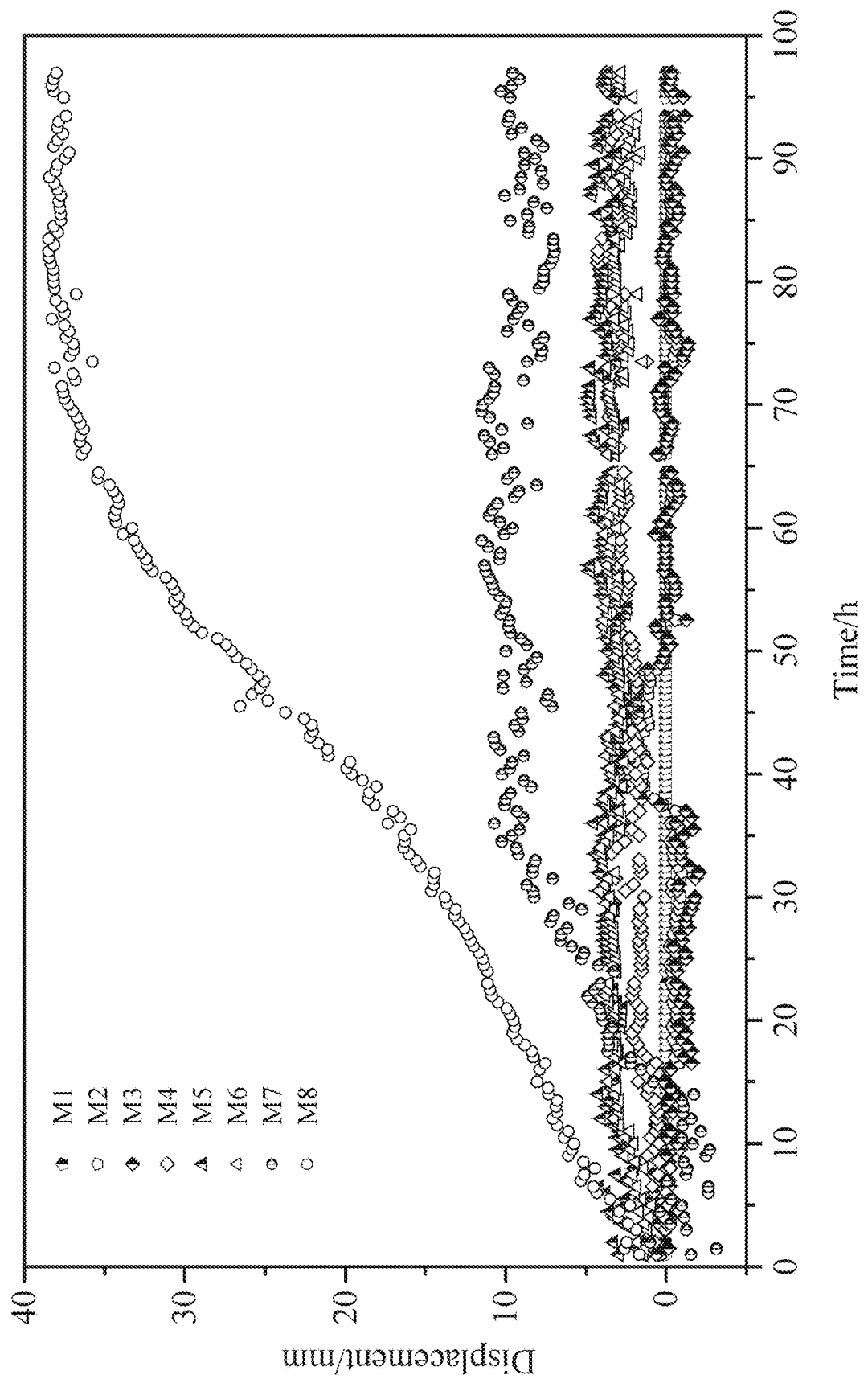
FIG. 15 is a graph of individual sensor displacement versus time.

After the measuring tube was installed, and 24 hours of grouting in the hole, the TBM began to excavated. The total length of the excavation was 45 m, and the convergence deformation of the surrounding rock of the vault was measured for 98 hours. By converting the monitored signal into a displacement value, the relative displacement change of each level with time is obtained, as shown in FIG. 15.

It can be seen from the relative deformation between the level gauges that as time increases, the relative displacement between the monitoring points gradually increases and tends to be stable. There is an obvious deformation gradient between the measuring points. The closer to the wall position, the larger the relative deformation. The value from M8 level gauge is the largest (0.65 m from the wall and 38 mm from the vertical), and the measured value tends to be sharply decreased from inside to outside. The measured values from M1-M3 level gauges are very small, and the rock body within the measurement range of 6.3 m is less distorted during the entire excavation process. The measured values of each level are accumulated to obtain the total displacement change with respect to the fixed point A during the change of the measurement position with the measurement time, as shown in FIG. 16.

Figure 16:
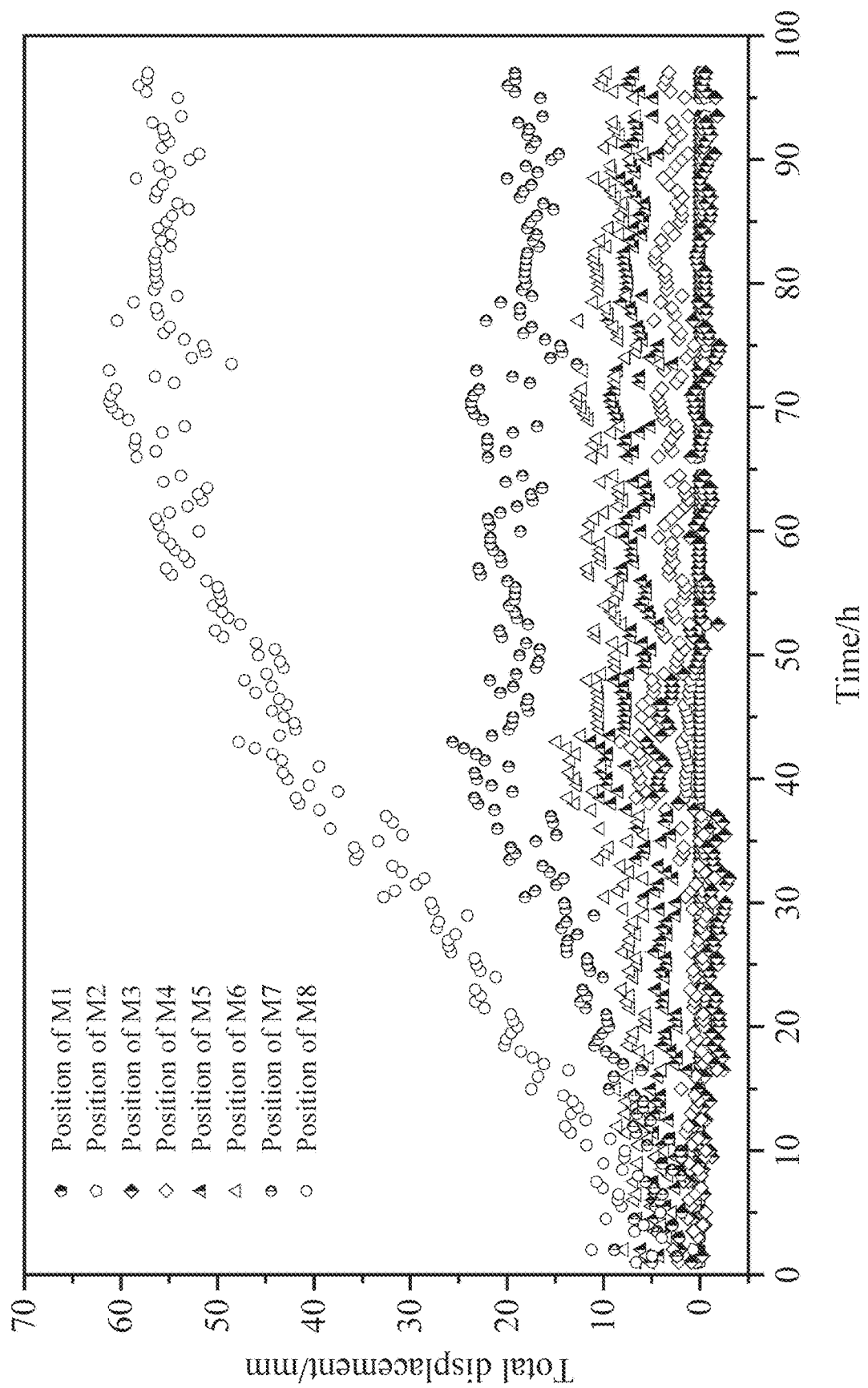
FIG. 16 is a graph of the total displacement and time of each monitoring point.

It can be seen from FIG. 16 that since the monitoring values of the level gauges tend to be constant with time, the displacement of the rock body at each monitoring position relative to the fixed points gradually converges to a constant value, wherein the total deformation of the rock body at the M8 position which is closest to the wall of the tunnel reaches 58 mm, and as the depth of the wall increases, the deformation of the rock body at the test position decreases significantly, such as the displacement at M7 measuring point which is at a vertical distance of 0.48 m from M8 is 20 mm. The above measured values are converted into the excavation distance relationship as shown in FIG. 17.

Figure 17:
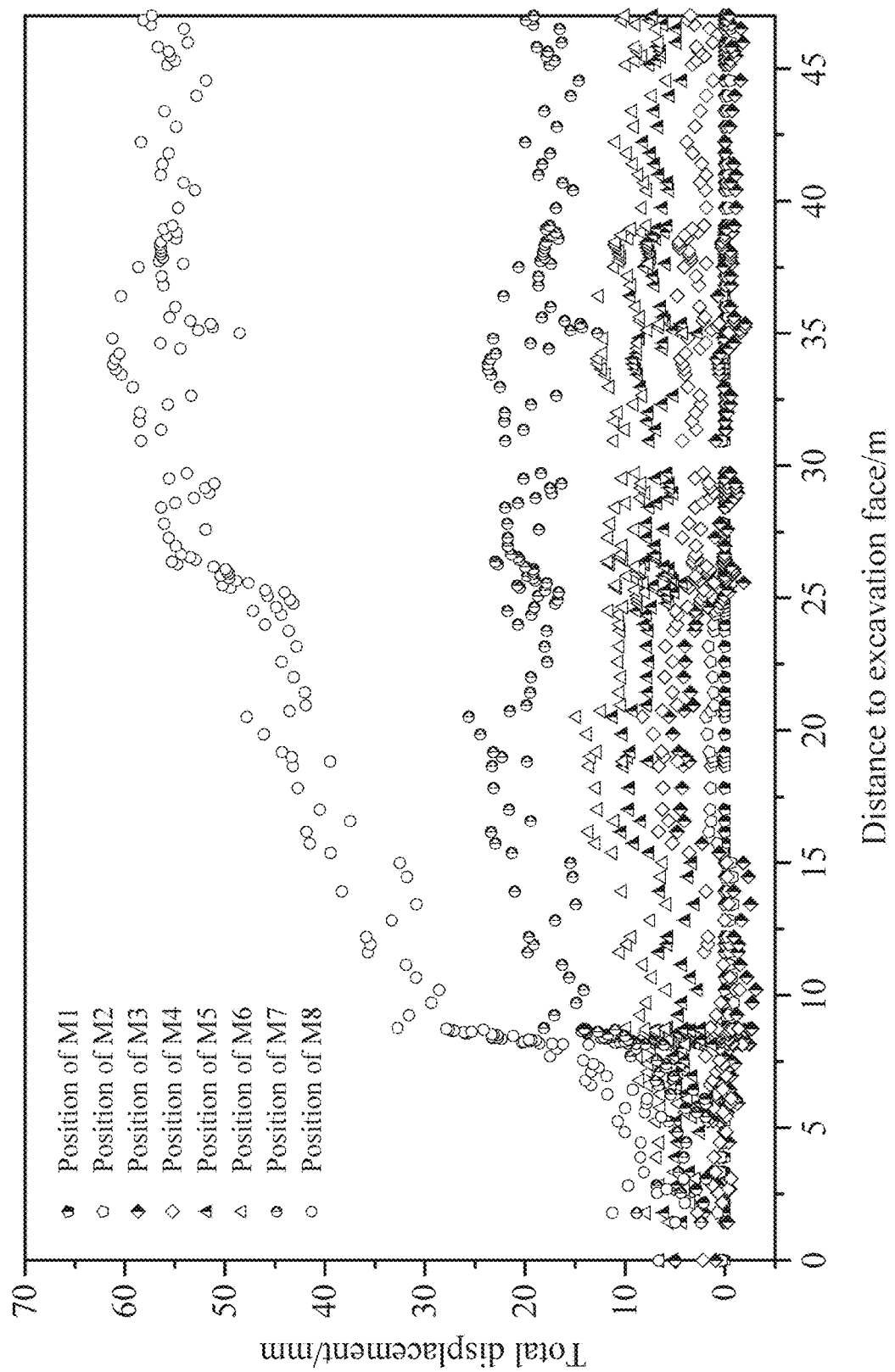
FIG. 17 is a graph of the total displacement and the distance of the face of each monitoring point.

It can be seen from FIG. 17 that the displacement obtained by the monitoring is the same as the general rule of theoretical analysis and numerical simulation. The tunnel face has obvious supporting effect on the surrounding rock, and the distance between the monitoring position of the level gauge and the tunnel face increases. The surrounding rock in the hollow section is convergent and deformed into the cave. The monitoring value gradually converges and stabilizes. There is no significant change in the monitoring data during the advancement of the tunnel face. A double shield IBM is used in the project, with a gap of 7 cm between the front shield and the surrounding rock, and a gap of 10 cm between the tail shield and the surrounding rock. The surrounding rock of the roof substantially does not contact the shield, and there is no obvious phenomenon of squeezing shield. The friction with the surrounding rock to be overcome as the IBM advanced is relatively small. During the excavation process, the equipment showed that the total thrust of the cylinder was about 16 MN, and the excavation was smooth.

CONCLUSION

The deformation of surrounding rock during the double shield TBM excavation in a tunnel in Tibet was measured in real time, and the deformation curve of surrounding rock with 98 hours of excavation and 45 m of excavation distance was obtained. The results show that by installing the measuring pipe welded by steel pipe in the double shield TBM advanced drilling hole and providing FBG static level gauges in series in the pipe, a deformation curve of the surrounding rock during the TBM excavation process can be well obtained. The measured value is stable and can directly reflect the real-time deformation value of the surrounding rock, which facilitates the discrimination and analysis of jamming. Relying on the measured values of the project, the deformation of the surrounding rock gradually stabilized with the increase of the excavation distance during the excavation process of the Duoxiong tunnel. There are obvious gradients in the deformation of the surrounding rock at different locations, and the final measured value is 58 mm.

We claim:

1. An advanced monitoring device for deformation curve of a surrounding rock during tunnel excavation, comprising:
   the surrounding rock (1),
   an excavation tunnel (2) opened in the surrounding rock (1),
   a drilling hole (3) provided in the surrounding rock (1) and connected to the excavation tunnel (2), and is disposed at one side with a drilling hole outer port sealing body (301),
   a grouting pipe (302) and a steel pipe (4) disposed in the drilling hole (3), a steel pipe optical fiber slot (402) and a steel pipe embedded optical fiber entry hole (403) opened on the outer surface of the steel pipe (4), a steel pipe outer end sealing body (401) is provided at one end of the steel pipe (4), and a steel pipe inner plug (404) is provided at the other end of the steel pipe (4),
   a steel pipe embedded optical fiber (5) encapsulated in the steel pipe optical fiber slot (402), the steel pipe embedded optical fiber (5) is led out of both ends of the steel pipe (4),
   at least one cathetometer (6) disposed in the steel pipe (4), the cathetometer (6) is connected in series by cathetometer optical fibers (601), and is fixed to the steel pipe inner plug (404) at the inner end of the steel pipe (4) by a cathetometer securing cable (7), and
   a cathetometer pipet (602) connected to the cathetometer (6) and the cathetometer optical fiber (601) by the cathetometer securing cable (7).

2. The device according to claim 1, wherein the drilling hole (3) is located in the top surrounding rock (1) in front of the excavation face of the excavation tunnel (2), in line with the direction of the tunnel (2) axis and at an angle to the tunnel (2) axis, the drilling hole (3) is drilled through a TBM observation hole or formed at other operable places.

3. The device according to claim 1, wherein the cathetometer (6) is fixed into the steel pipe (4) in a series structure formed at equidistant or variable distance through the cathetometer optical fiber (601), with both ends of the cathetometer optical fiber (601) is measurable for signal measurement.

4. The device according to claim 1, wherein the steel pipe embedded optical fiber (5) encapsulated inside the steel pipe optical fiber slot (402) enters the steel pipe (4) through the steel pipe embedded optical fiber entry hole (403) and is drawn out of the pipe for measurement.

5. The device according to claim 1, wherein the steel pipe embedded optical fiber (5) is encapsulated in the steel pipe of the optical fiber slot by epoxy resin or other bonding materials, and forms a deformation coordination body with the steel pipe (4).

6. The device according to claim 1, wherein the steel pipe embedded optical fiber (5) and the steel pipe embedded optical fiber entry hole (403) can both be provided in multiples to meet length requirements on different measurement.

7. The device according to claim 1, wherein the steel pipe embedded optical fiber (5) is an FBG optical fiber.

8. The device according to claim 1, wherein the steel pipe embedded optical fiber (5) and the cathetometer optical fiber (601) can be drawn out of the drilling hole (3) through the drilling hole outer port sealing body (301) for measurement.

9. An implementation method for the advanced monitoring device for a whole-process deformation curve of the surrounding rock for tunnel excavation according to claim 1, comprising the following steps:

Step 1: producing drilling hole(s) (3) at the top of the excavation section of the excavation tunnel (2) according to the measurement needs;

Step 2: making a steel pipe optical fiber slot (402) and a steel pipe embedded optical fiber entry hole (403) in corresponding positions of the steel pipe;

Step 3: connecting cathetometers (6) in series, and injecting a certain amount of solution into each cathetometer pipet (602) to conduct measurement; fixing the cathetometer (6) to the inner end of the steel pipe plug (404) through the cathetometer securing cable (7) and fixing the steel pipe inner end plug (404) to the inner end of the steel pipe (4); if there are a plurality of cathetometer (6) series structures, they can be arranged in the steel pipe (4) at equidistant or marginal distance, and leading the cathetometer (6) optical fiber out of the pipe;

Step 4: encapsulating the steel pipe embedded optical fiber (5) in the steel pipe optical fiber slot (402), and leading the two ends of the optical fiber out of the pipe;

Step 5: putting the steel pipe (4) into the drilling holes (3) separately, conducting weld to each segment, and connecting and arranging the cathetometer (6) according to the length and encapsulating the steel pipe embedded optical fiber (5), and leading the cathetometer (6) optical fiber and the end of the steel pipe embedded optical fiber (5) through the steel pipe (4) and finally out of the pipe;

Step 6: fixing the steel pipe (4) after all the steel pipes (4) are placed in the drilling hole (3), leading the steel pipe embedded optical fiber (5) out of the drilling hole (3), and sealing the ends of the steel pipe (4);

Step 7: sealing the aperture of the drilling hole (3);

Step 8: grouting the drilling hole (3) through the grouting pipe (302), so that the steel pipe (4) and the surrounding rock (1) form a deformation coordination structure through the grouting body;

Step 9: conducting tunnel excavation, and measuring the cathetometer optical fiber (601) and the steel pipe embedded optical fiber (5), and recording the data;

Step 10: processing the measurement data and calculating the deformation curve of the surrounding rock.

* * * * *